United States Patent
Rickle et al.

(10) Patent No.: US 6,740,236 B2
(45) Date of Patent: May 25, 2004

(54) FUEL FILTER ASSEMBLY HAVING A CONDUCTIVE SPRING

(75) Inventors: Gary L. Rickle, Wharton, OH (US); Michael E. Yost, Tiffin, OH (US)

(73) Assignee: Kuss Corporation, Findlay, OH (US)

( * ) Notice: Subject to any disclaimer, the term of this patent is extended or adjusted under 35 U.S.C. 154(b) by 84 days.

(21) Appl. No.: 09/962,037

(22) Filed: Sep. 25, 2001

(65) Prior Publication Data

US 2003/0057146 A1 Mar. 27, 2003

(51) Int. Cl.$^7$ ................................................ B01D 35/14
(52) U.S. Cl. ..................... 210/243; 210/455; 210/493.1; 361/215
(58) Field of Search ................................. 210/243, 440, 210/455, 458, 493.1, 493.2; 361/212, 215, 216

(56) References Cited

U.S. PATENT DOCUMENTS

| | | | |
|---|---|---|---|
| 3,726,403 A | * | 4/1973 | Shaltis ........................ 210/132 |
| 4,187,179 A | | 2/1980 | Harms |
| 4,661,250 A | | 4/1987 | Rosenberg |
| 4,999,108 A | | 3/1991 | Koch et al. |
| 5,080,787 A | | 1/1992 | Brown et al. |
| 5,217,606 A | | 6/1993 | Ramponi et al. |
| 5,382,351 A | | 1/1995 | Miller et al. |
| 5,584,987 A | | 12/1996 | Mules |
| 5,665,231 A | | 9/1997 | Langsdorf et al. |
| 5,898,560 A | | 4/1999 | Flaynik, Jr. et al. |
| 6,045,704 A | * | 4/2000 | Sato et al. .................... 210/694 |
| 6,099,726 A | | 8/2000 | Gembolis et al. |
| 6,156,201 A | | 12/2000 | Ueda et al. |
| 6,168,713 B1 | | 1/2001 | Sekine et al. |

FOREIGN PATENT DOCUMENTS

| | | | | |
|---|---|---|---|---|
| DE | 3325526 C2 | * | 4/1985 | ........... B01D/27/08 |
| EP | 402657 A2 | * | 12/1990 | ........... B01D/35/06 |
| JP | 2000-130280 A | * | 5/2000 | ........... F02M/37/22 |

* cited by examiner

*Primary Examiner*—Matthew O. Savage
(74) *Attorney, Agent, or Firm*—Brinks Hofer Gilson & Lione

(57) ABSTRACT

A fuel filter includes features adapted to collect and drain static electrical charges occasioned by the passage of fuel therethrough. The filter includes a two-piece plastic housing having an end cap and a cylindrical portion with an end defining inlet and outlet fittings. The filter element is cylindrical and includes an outer perforated metal shell, an intermediate pleated paper filter and an inner perforated metal shell. Both metal shells are secured and electrically coupled to an electrically conductive end cap. The electrically conductive end cap is electrically and mechanically connected to a conductive, circular spring. The spring engages a ground pin which extends through the cylindrical portion of the housing and may be connected to a suitable ground to drain off static electrical charges generated by fuel flowing through the filter. The other end of the filter element is either embedded in the housing end cap or, in an alternate embodiment, a smaller end cap which is received in the housing end cap.

16 Claims, 4 Drawing Sheets

FUEL FILTER ASSEMBLY HAVING A CONDUCTIVE SPRING

BACKGROUND OF THE INVENTION

The invention relates to a fuel filter assembly having electrically conductive features and more particularly to a fuel filter assembly having an electrically conductive spring which electrically connects electrically conductive filter components disposed within a housing with a conductive pin extending through the housing.

For many years, fuel filters in motor vehicles comprised a filter element disposed within a metallic housing at a convenient location in the fuel line, often times in the engine compartment. While hoses to and from the housing were generally rubber and thus non-conductive, the housing was metal and was secured to a component or panel of the automobile and was thus grounded. Accordingly, any electrostatic charge generated by passage of fuel through the filtration element was readily and safely grounded through the filter housing to the motor vehicle body.

The constant study of vehicle weight directed to weight reduction as well as continuing development of plastics and polymers has affected the fuel delivery and filtration systems of vehicles as it has nearly every vehicle system and component. Rather than metal, filter housings are now frequently fabricated of a fuel tolerant plastic such as nylon. Such a construction results in the filtration element being electrically insulated from the vehicle ground. An electrostatic discharge (ESD) may result as electrostatic charge in the filtration element increases as a result of fuel flow therethrough. Frequently, such discharges occur through the housing to the most proximate metallic vehicle body feature. Repeated discharge can result in leakage through the filter housing which is unacceptable.

In response to this problem, filtration devices have been developed which seek to eliminate electrostatic discharges and their consequences by providing a drainage path to ground which prevents build up of an electrostatic charge. For example, U.S. Pat. No. 4,187,179 discloses an electrically conducting spring in a swimming pool filter having a plurality of non-conductive filtration cartridges. The filtration cartridges are mounted upon a conductive end plate and a plurality of electrically conducting resilient leaf springs contact an outer conductive housing and drain static charges from the plate.

U.S. Pat. No. 4,999,108 teaches a fuel filtration device having a perforated metal cylinder with inner and outer filter elements. The cylinder is in contact with a wire in an end plate which communicates with a conductive mounting stud.

U.S. Pat. No. 5,382,351 discloses plating a filter housing, inside and out, with a conductive material such as chromium, nickel or copper by vacuum metalization or sputtering.

U.S. Pat. No. 5,584,987 teaches a fluid filter configuration in which a compression spring retains and biases a filter element toward one end of the housing.

U.S. Pat. No. 5,898,560 discloses a filter having a conductive housing with an electrically conductive member and means for converting laminar flow to turbulent flow.

U.S. Pat. No. 6,168,713 also discloses a filter assembly having a conductive path for draining an electrostatic charge to ground.

The foregoing six United States Patents are directed to the above-referenced difficulty and it is therefore apparent that fuel filtration devices directed to minimizing or eliminating the problem of electrostatic discharge are highly desirable.

BRIEF SUMMARY OF THE INVENTION

A fuel filter includes features adapted to collect and drain static electrical charges occasioned by the passage of fuel therethrough. The filter includes a two-piece plastic housing having an end cap and a cylindrical portion with an end defining inlet and outlet fittings. The filter element is cylindrical and includes an outer perforated metal shell, an intermediate pleated paper filter and an inner perforated metal shell. Both metal shells are secured and electrically coupled to an electrically conductive end cap. The conductive end cap is electrically and mechanically connected to a conductive, circular spring. A portion of the spring engages a conductive pin which extends through the cylindrical portion of the housing and may be connected to a suitable ground to drain off static electrical charges generated by fuel flowing through the filter. The other end of the filter element is either embedded in the housing end cap or, in an alternate embodiment, a smaller end cap which is received in the housing end cap.

It is thus an object of the present invention to provide a fuel filter assembly intended to minimize electrostatic discharge.

It is a further object of the present invention to provide a fuel filter assembly having a filtration element surrounded by inner and outer conductive elements.

It is a still further object of the present invention to provide a fuel filter assembly having a pleated paper filter surrounded by conductive metal elements.

It is a still further object of the present invention to provide a fuel filter assembly having conductive elements which cooperate with a conductive spring and pin to drain off electrostatic charges from fuel passing therethrough.

It is a still further object of the present invention to provide a fuel filter assembly and housing wherein a conductive metal surround, a conductive end cap, a conductive spring and a conductive pin define an electrical path to the exterior of the housing to drain off electrostatic charges resulting from fuel filtration.

Further objects and advantages of the present invention will become apparent by reference to the following description of the preferred embodiment and appended drawings wherein like reference numbers refer to the same component, element or feature.

DETAILED DESCRIPTION OF THE PREFERRED AND ALTERNATE EMBODIMENTS

Figure 1:
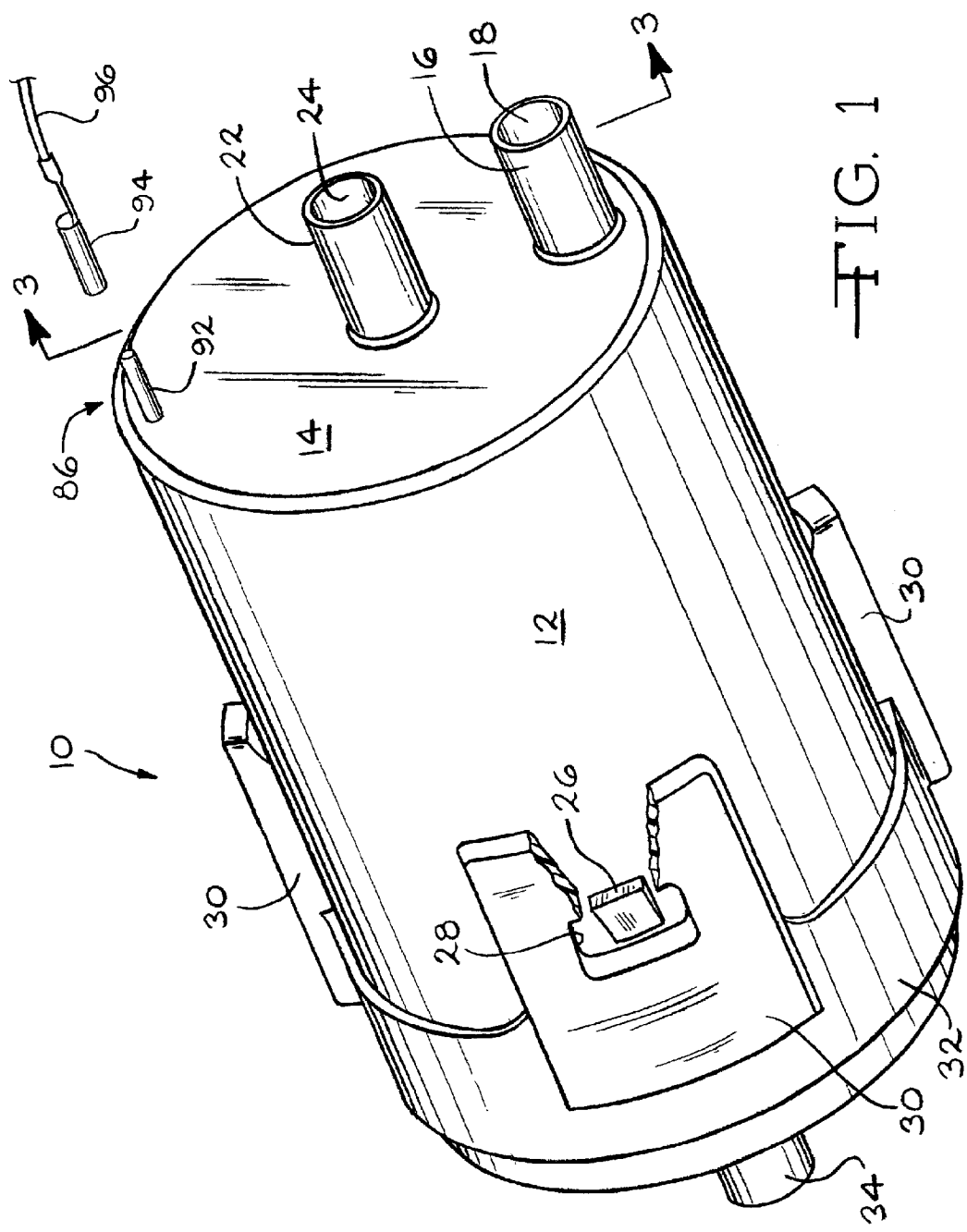
FIG. 1 is a perspective view of a preferred embodiment of a fuel filter assembly according to the present invention with a portion of the housing broken away.
Figure 2:
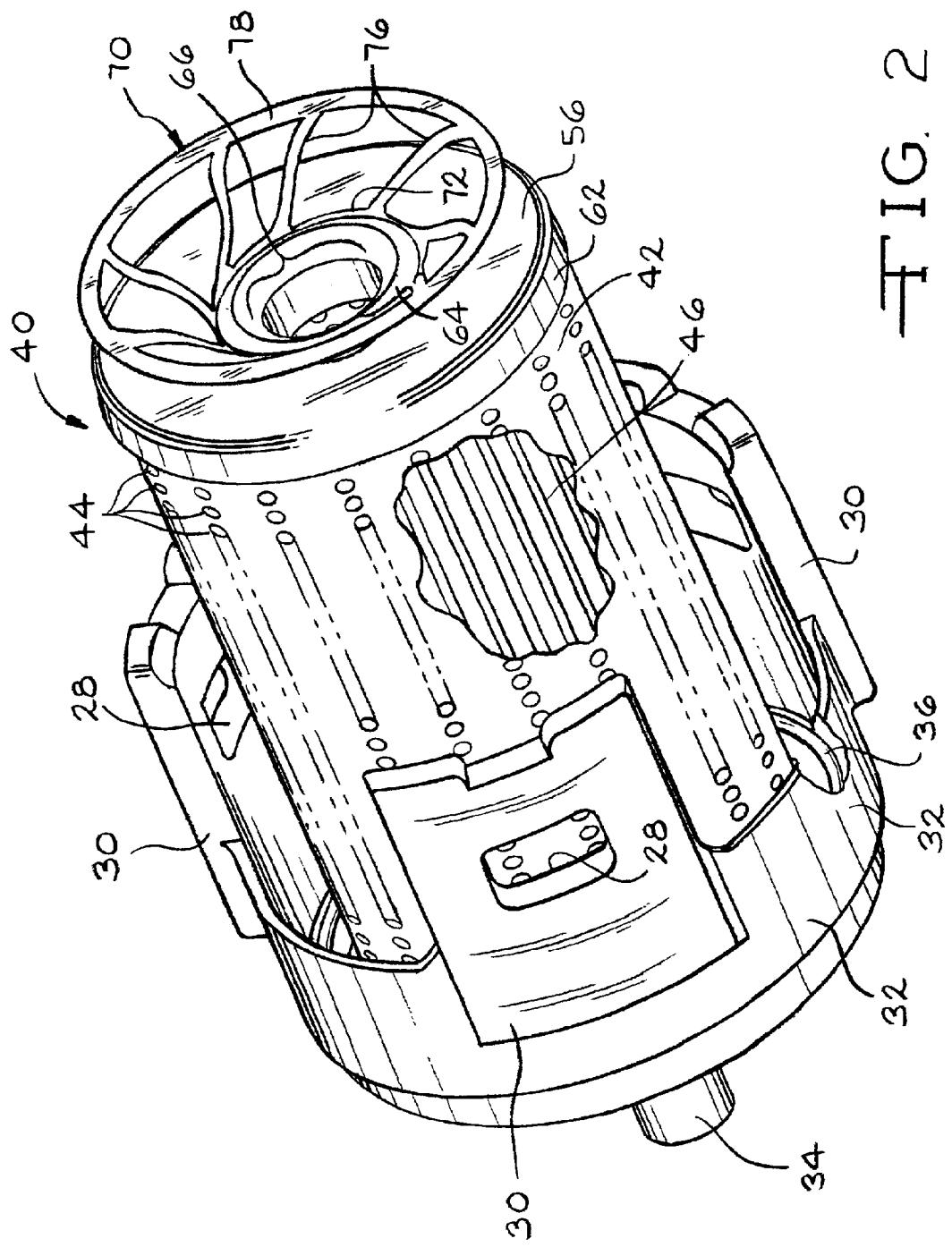
FIG. 2 is a perspective view of a fuel filter assembly according to the present invention with the cylindrical housing removed.

Referring now to FIGS. 1 and 2, a fuel filter assembly according to the present invention is illustrated and generally designated by the reference number 10. The fuel filter assembly 10 includes a cylindrical housing 12 having a closed end 14 which includes an inlet fitting 16 defining an inlet passageway 18 and an outlet fitting 22 defining an outlet passageway 24. The inlet fitting 16 and the outlet fitting 22 are suitably sized to receive conventional flexible fuel hose or the like. At three preferably equally spaced locations about the outside wall of the cylindrical housing 12, are disposed locking cam tabs 26 which cooperate with rectangular apertures 28 defined by a like number of ears 30 which extend axially from a circular end cap 32. The cylindrical housing 12 and the circular end cap 32 are preferably fabricated of a fuel tolerant plastic such as nylon or acetal as well as other plastics having appropriate strength, temperature stability and tolerance for long term exposure to hydrocarbon fuels. A pressure relief or bypass fitting 34 extends from the circular end cap 32 and may include an integral pressure relief valve (not illustrated) and typically receives a fuel hose or other conduit (also not illustrated). An O-ring 36 seats in a suitable groove in the circular end cap 32 and provides a fluid tight seal between the cylindrical housing 12 and the end cap 32 when these components are assembled.

Figure 4:
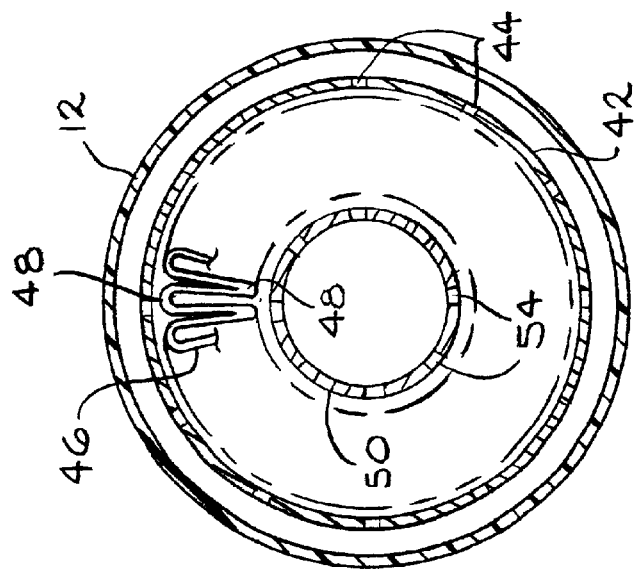
FIG. 4 is a full, sectional view of a fuel filter assembly according to the present invention taken along line 4—4 of FIG. 3.
Figure 3:
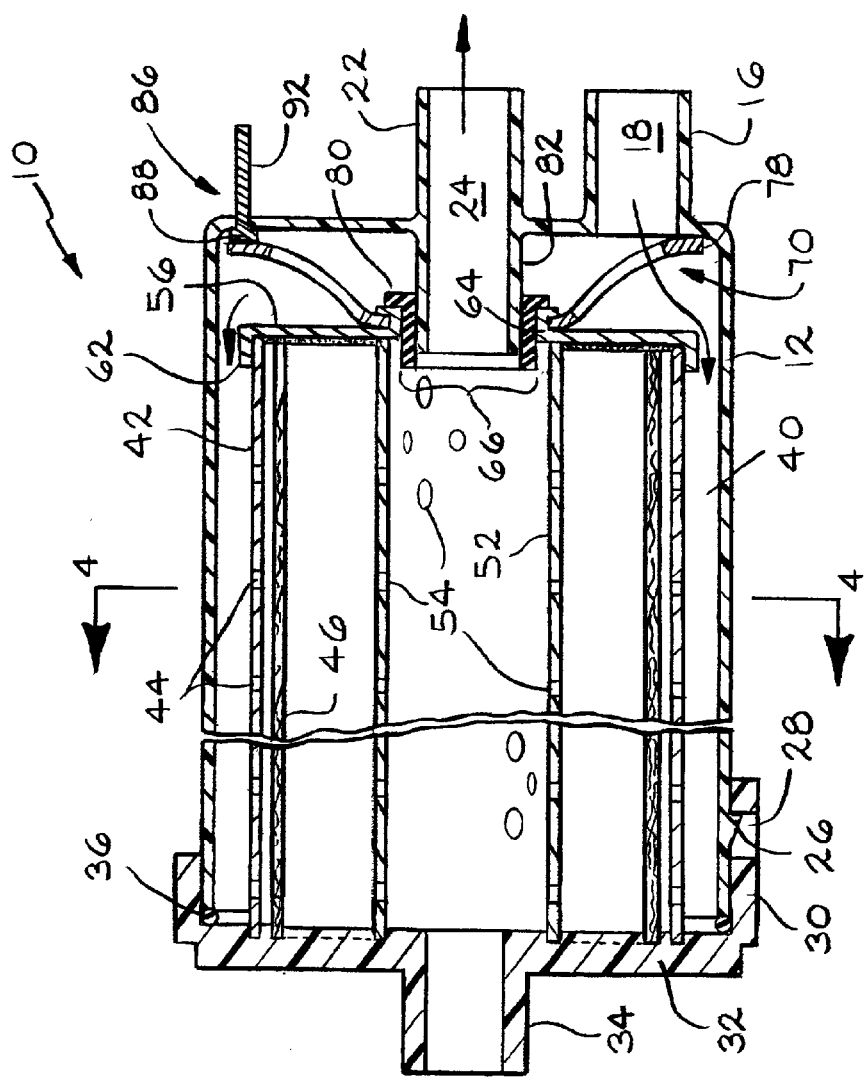
FIG. 3 is a full, sectional view of a fuel filter assembly according to the present invention taken along line 3—3 of FIG. 1.

Referring now to FIGS. 2, 3 and 4, the filtration element 40 is cylindrical and has a first or outer cylindrical conductive metal shell 42 defining a plurality of perforations 44 preferably disposed in circumferentially spaced apart axial rows although other patterns or a random distribution may be readily used. Adjacent the inner surface of the perforated metal shell 42 is a pleated paper filter element 46. The pleated paper filter element 46 is generally cylindrical and defines a plurality of longitudinal pleats or folds 48 on inner and outer faces and has adjacent axial edges which are sealed or glued together with a fuel tolerant adhesive. The pleated paper filter element 46 provides a relatively large surface area filter in a small volume. Adjacent the inner surface of the pleated filter element 46 is a second or inner cylindrical conductive metal shell 52. Like the outer conductive metal shell 42, the inner conductive metal shell 52 includes a plurality of perforations 54 aligned and spaced apart in axially extending rows. Again, other patterns or a random distribution of the perforations 54 may be used.

At one end of the filtration element 40 is a conductive metal end cap 56 into which the three filter elements: the outer conductive metal shell 42, the pleated paper filter element 46 and the inner conductive metal shell 52 are received and secured by a suitable electrically conductive adhesive 58 such as conductive plastisol. The metal end cap 56 includes an outer lip or flange 62 which extends in one axial direction and locates the outer conductive metal shell 42 and an inner lip or flange 64 extending in the opposite axial direction. The inner lip or flange 64 defines a circular outlet opening 66.

Received upon the inner lip or flange 64 is a generally circular, electrically conductive compression spring 70. The conductive compression spring 70 is preferably fabricated of a suitable resilient metal such as spring steel or phosphor bronze and defines symmetrical curves in cross section (FIG. 3) and thus overall defines a horn-like shape having an inner circular region or ring 72 defining a circular aperture or opening, a plurality of obliquely oriented webs or ribs 76 and an outer circular region or ring 78. The ring 72 is disposed about the inner lip or flange 64 of the metal end cap 56 of the filtration element 40 which is rolled or crimped on or over the compression spring 70, thereby both securely retaining it on the metal end cap 56 and providing a sound electrical path between the metal end cap 56 and the compression spring 70. The end of the filtration element 40 opposite the metal end cap 56 is embedded in the circular end cap 32. That is, the outer conductive metal shell 42, the pleated paper filter element 46 and the inner metal shell 52 are all embedded within and intimately bonded to the plastic material from which the circular end cap 32 is fabricated.

Returning to the end of the filtration element 40 having the metal end cap 56, it also includes a rubber or elastomeric collar or grommet 80 which is received within the opening 66 of the metal end cap 56 and itself is received upon a cylindrical extension 82 of the outlet fitting 22 thereby concentrically and positively locating the filtration element 40 within the cylindrical housing 12.

Aligned with the outer ring 78 of the conductive spring 70 is a conductive, preferably metal, pin 86 which is securely mounted to and extends through the end of the housing 12. The conductive pin 86 may be secured to the housing 12 by an interference fit, barbs extending from the pin 86 or a fastener such as a push on (one way) nut. The conductive pin 86 defines an enlarged head region 88 and an elongate body 92 which may be engaged by a suitable electrical connector such as a push on or clamp on connector 94. The electrical connector 94 is the terminal portion of an electrical wire or lead 96 which is preferably connected to a ground feature, such as a metal panel, strut, brace or frame of a vehicle or device. While illustrated and described as being axially disposed, the conductive pin 86 may also be radially disposed, extending through the sidewall of the housing 12 or oriented in some other manner.

Accordingly, both the outer conductive metal shell 42 and the inner conductive metal shell 52 are coupled, through the conductive metal end cap 56 and the conductive spring 70 to the conductive pin 86 and the electrical lead 96 to a vehicle ground, thereby draining off any static electrical charges that may accumulate within the fuel filter assembly 10 and effectively reducing both the likelihood of an accumulation of static electricity and an electrostatic discharge within the filtration assembly 10 resulting from fuel flow therethrough. The conductive spring 70 provides a spring force against the conductive pin 86 to provide and ensure a positive electrical connection therebetween notwithstanding variations in component size or alignment due to manufacturing tolerances or thermal expansion and contraction, for example.

Figure 5:
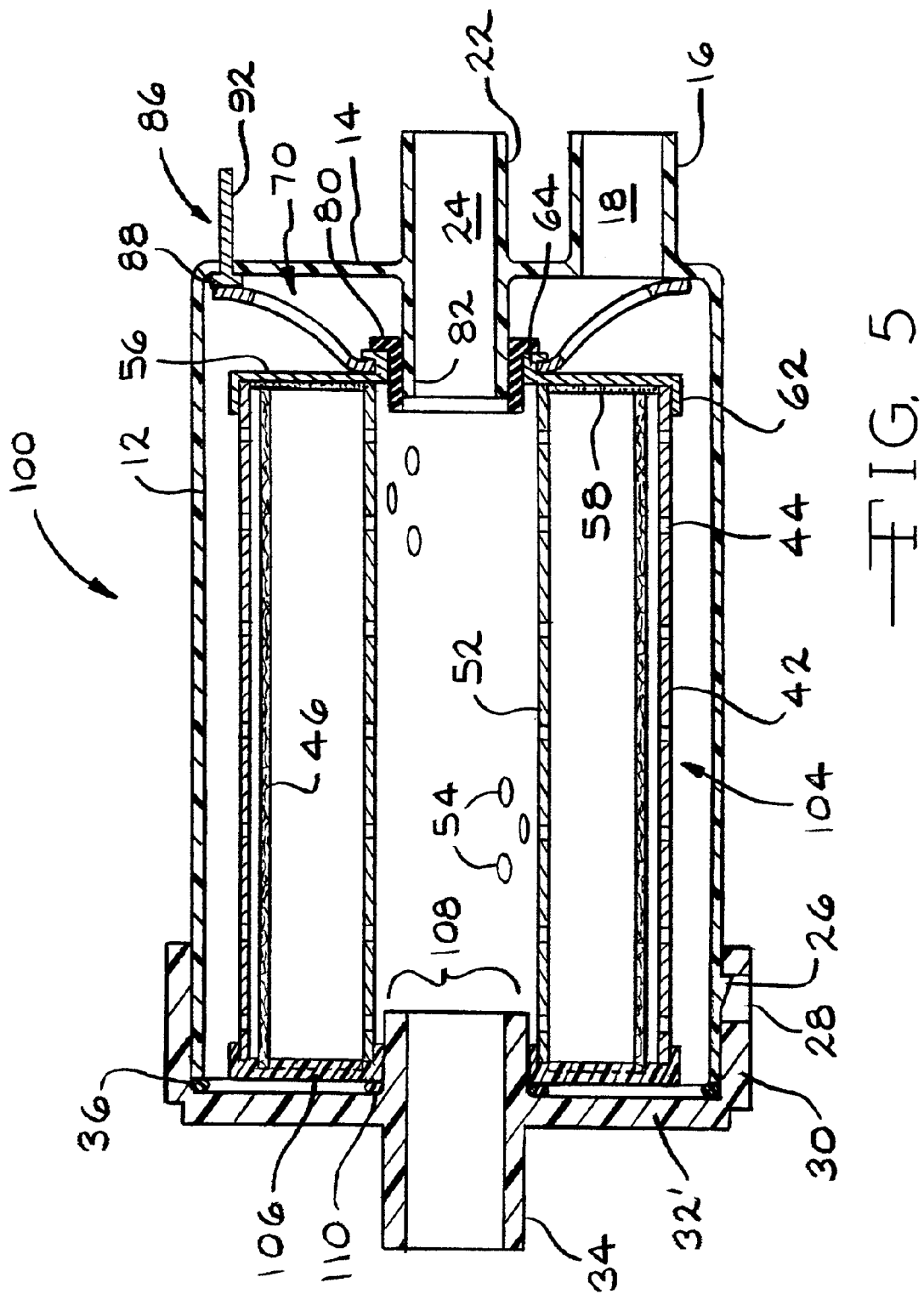
FIG. 5 is a full, sectional view of an alternate embodiment of a fuel filter assembly according to the present invention.

Referring now to FIG. 5, an alternate embodiment 100 of a fuel filter assembly having electrically conductive features is illustrated. The alternate embodiment fuel filter assembly 100 is similar in many respects to the preferred embodiment fuel filter assembly 10 and includes the same cylindrical housing 12 having the closed end 14 which defines the inlet fitting 16 having the inlet passageway 18 and the outlet fitting 22 defining the outlet passageway 24. A plurality of locking cam tabs 26, one of which is illustrated in FIG. 5, are received within apertures 28 formed in ears 30 which extend axially from a circular end cap 32'. The circular end cap 32' includes a pressure relief or bypass fitting 34. The circular end cap 32' is distinct from the circular end cap 32 of the preferred embodiment fuel filter assembly 10 in that it is a component separate from and independent of a filtration element 104.

The filtration element 104 is similar to the filtration element 40 of the preferred embodiment filter assembly 10 in that it includes the first or outer cylindrical conductive metal shell 42 having perforations 44, the pleated paper filter element 46 and the second or inner cylindrical conductive metal shell 52 having perforations 54. These components of the filtration element 40 are secured at one end to the metal end cap 56 through the agency of the conductive adhesive 58 such as plastisol. The conductive metal end cap 56 includes the outer lip or flange 62 and the inner lip or flange 64 which defines the circular outlet opening 66. The inner lip or flange 64 is rolled or crimped over the conductive resilient spring 70 and the collar or grommet 80 is received therewithin and sealingly receives the cylindrical extension 82 of the outlet fitting 22.

The opposite end of the filtration element 104 is distinct from that of the preferred embodiment filtration element 40 in that the ends of the outer cylindrical conductive metal shell 42, the pleated paper filter element 46 and the inner cylindrical conductive metal shell 52 are embedded in and sealingly secured to an end closure or circular disc 106. The circular disc 106 defines an opening 108 which is received about the pressure release or bypass fitting 34. An O-ring 110 is disposed about the bypass fitting 34 and the circular disc 106 sealingly engages such O-ring 110 thereby inhibiting the flow of unfiltered fuel around the end of the filtration element 104 and into the interior region of the filtration element 104.

Although the fuel filters 10 and 100 have been described herein as having particular application with regard to motor vehicles, it should be appreciated that the problem of electrostatic charge generation and discharge is common to all engine fuel systems, whether residing in a moveable vehicle such as a car, truck, van, boat, ship, airplane or helicopter or at a fixed installation such as an electrical generator, irrigation pump, air blower, winch, amusement park device or one of many other stationary engine installations and applications. Thus the invention and its applications should not be construed to be limited by the foregoing references to its use and application in motor vehicles but should be construed as having application in all the just recited uses and others.

The foregoing disclosure is the best mode devised by the inventors for practicing the invention. It is apparent, however, that filtration devices incorporating modifications and variations will be obvious to one skilled in the art of fuel filtration. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A fuel filter for a fuel delivery system comprising, in combination,
   a housing having an inlet and an outlet,
   a filtration element disposed in said housing and having an outer electrically conductive shell defining a plurality of openings, an intermediate filter element, an inner electrically conductive shell defining a plurality of openings and at least one electrically conductive end cap,
   an electrically conductive spring defining an outer ring, an inner ring and a plurality of ribs extending between said rings, said spring in electrical communication with said shells through said end cap, and
   an electrically conductive member extending through said housing and contacting said electrically conductive spring,
   whereby electrostatic charges on said shells drain off through said electrically conductive end cap, spring and member.

2. The fuel filter of claim 1 wherein said housing includes a cylindrical body.

3. The fuel filter of claim 1 wherein said inlet and outlet extend from said cylindrical body and said electrically conductive member extends through said cylindrical body.

4. The fuel filter of claim 1 wherein said housing is fabricated of a fuel tolerant, non-conductive plastic.

5. The fuel filter of claim 5 wherein said electrically conductive end cap and said inner and outer electrically conductive shells are made of metal.

6. The fuel filter of claim 1 wherein said filtration element is pleated paper.

7. A fuel filter for a fuel delivery system comprising, in combination,
   a housing having an inlet and an outlet,
   a filtration element disposed in said housing and having an outer metal shell defining a plurality of openings, an intermediate filter element an inner metal shell defining a plurality of openings and a pair of ends, one of said pair of ends being electrically conductive,
   an electrically conductive spring electrically connected through said electrically conductive end to said shells, said electrically conductive spring defining a larger ring, a smaller ring and a plurality of ribs extending between said rings, and
   an electrically conductive member extending through said housing and contacting said spring,
   whereby electrostatic charges on said metal shells drain through said electrically conductive spring and said electrically conductive member.

8. The fuel filter of claim 7 wherein said housing is fabricated of a fuel tolerant, non-conductive plastic.

9. The fuel filter of claim 7 wherein said electrically conductive one of said pair of ends is made of metal.

10. The fuel filter of claim 7 wherein said filtration element is pleated paper.

11. The fuel filter of claim 7 wherein said housing includes a cylindrical body and an end and said filtration element is secured to said end.

12. A fuel filter for a fuel delivery system comprising, in combination,
    a housing having an inlet fitting and an outlet fitting,
    a filtration element disposed in said housing and having an outer metal shell defining a plurality of openings, an intermediate pleated paper filter element, an inner metal shell defining a plurality of openings and an electrically conductive end cap,
    a compression spring defining a larger outer ring, a smaller inner ring and a plurality of oblique ribs extending between said rings, said compression spring electrically connected through said end cap to said shells, and
    an electrically conductive member extending through said housing and contacting said compression spring.

13. The fuel filter of claim 12 wherein said housing includes a cylindrical body and an end cap.

14. The fuel filter of claim 12 wherein said housing is fabricated of a fuel tolerant, non-conductive plastic.

15. The fuel filter of claim 12 wherein said inlet fitting and outlet fitting extend through an end of said housing and said electrically conductive member extends through said end.

16. The fuel filter of claim 12 wherein said electrically conductive member is a pin having an enlarged head disposed within said housing and an elongate portion extending through said housing.

* * * * *

UNITED STATES PATENT AND TRADEMARK OFFICE
CERTIFICATE OF CORRECTION

PATENT NO. : 6,740,236 B2
DATED : May 25, 2004
INVENTOR(S) : Gary L. Rickle et al.

It is certified that error appears in the above-identified patent and that said Letters Patent is hereby corrected as shown below:

<u>Column 6,</u>
Line 1, delete "claim 1" and substitute -- claim 2 -- in its place.
Line 6, delete "claim 5" and substitute -- claim 1 -- in its place.

Signed and Sealed this

Eighth Day of February, 2005

JON W. DUDAS
*Director of the United States Patent and Trademark Office*